Patented Dec. 27, 1932

1,891,962

UNITED STATES PATENT OFFICE

ANDREW T. K. TSENG, OF DETROIT, MICHIGAN, ASSIGNOR TO HYDRAULIC BRAKE COMPANY, OF LOS ANGELES, CALIFORNIA, A CORPORATION OF CALIFORNIA

FLUID COMPOSITION

No Drawing. Application filed October 24, 1927. Serial No. 228,499.

This invention relates to fluid compositions and pertains more particularly to fluid compositions for use in fluid pressure systems such as hydraulic brakes, check valves, etc.

Certain special characteristics are required of fluids used for this purpose, which are very difficult to obtain. The fluid must be stable both chemically and physically; its component parts must not react with each other under the various conditions of temperature and pressure to which it is subjected, and its component parts must not separate out at low temperatures. It must not react with the materials of which the container or exposed parts are composed, that is, it must not attack rubber, rubber compositions or metals, especially copper, cast iron and steel. It must have a relatively small co-efficient of expansion and it must have a relatively uniform viscosity through a wide range of temperatures.

The object of this invention is to provide a fluid which combines these requisites.

A further object is to provide a composition which will have a lower vapor pressure under given conditions, which will be less likely to separate out at low temperatures, which will minimize the corrosive action on metals especially copper and steel, which will have less effect on the physical properties of rubber, which will have a more constant viscosity, and which will be more suitable generally than the castor oil alcohol mixture heretofore used in the so-called hydraulic braking systems.

Heretofore ordinary denatured alcohol has been mixed with castor oil for overcoming the detrimental effect of the castor oil on the rubber used for cup washers and for piping. Also certain esters such as dibutylphthlate, triphenylphosphate, etc. when used with castor oil have been found to protect the rubber to a large extent and yield a stable solution. I have found that higher alcohols of the type illustrated by diacetone alcohol, $CH_3COCH_2C(CH_3)_2OH$, (4 hydroxy-2 keto-4 methyl pentane) are especially adapted for this use. A mixture of equal parts by volume of castor oil and diacetone alcohol has been found to give marked improvements over the old solutions.

A preferred embodiment of my invention is hereinafter set forth, but it is distinctly understood that I do not limit myself to the details therein specified. The diacetone alcohol preferably is colorless or of a light straw color, and contains at least 85% diacetone alcohol. There should not be more than a traceable amount of acetone present, it should be neutral to litmus and methyl orange, its boiling point, which is theoretically 166° C., should not be below 130° C. and its specific gravity should be from .916 to .922 at 15° C. It should give no turbidity when mixed with water, and its flash point should be from 3° C. to 4° C.

The castor oil preferably contains less than 1% free fatty acid, has an iodine number of 87 to 93, a saponification number of 176 to 180, a specific gravity of .959 to .963 at 60° F. and a refractive index of 1.499 to 1.480.

Potassium hydroxide is dissolved in the diacetone alcohol to yield a solution containing about five grams per gallon. In this step the alcohol should not be heated to hasten the solution of the potassium hydroxide, in that heat may bring about a decomposition of the alcohol into acetone, which in turn will dissolve the free sulphur of the rubber. This not only deleteriously effects the rubber, causing it to swell and disintegrate, but also forms compounds with the solution which corrodes the metals in the brake system. Long standing, after dissolving the potassium hydroxide should also be avoided, as it effects the stability of the diacetone alcohol.

To the above mixture is added an equal volume of caster oil. The oil is added slowly and with constant stirring. The resulting solution is well suited for use in fluid pressure systems, and it offers the following advantages:

1. Does not separate out at low temperatures.
2. Remains liquid even at −30 to −40° F.
3. Does not corrode copper, steel, cast iron, etc.

4. Has a higher boiling point and a lower vapor pressure than ordinary alcohol.

5. Does not swell or change the physical properties of rubber, even under summer heat.

6. Viscosity is more nearly uniform than with ordinary alcohol.

7. It is less likely to form acids.

While I have disclosed a preferred embodiment, it is understood that this is illustrative only. Thus instead of dissolving the potassium hydroxide in the diacetone alcohol, I may proceed in the manner pointed out in my co-pending application Serial No. 195,602, filed May 31, 1927. To use this method, fifty parts by volume of caster oil is added to fifty parts by volume of diacetone alcohol with constant and thorough stirring. A strong butyl alcoholic potassium hydroxide, which is previously made by dissolving potassium hydroxide in a minimum amount of butyl alcohol, is then added to the above mixture until the neutral point appears with phenolphthalein indicator. The mixture is then stirred.

The potassium hydroxide serves not only to neutralize the free acid in the castor oil, but it has been found to act as an anti-corrosive agent. The retardation of corrosive action is particularly noticeable when the solution is in contact with iron and steel.

While the proportions have been indicated as 50% diacetone alcohol and 50% castor oil, it is understood that this proportion may be varied without departing from the invention. An increase in the percentage of diacetone alcohol will cause the freezing point and viscosity to be decreased, and at the same time the cost of the fluid will be increased. The mixture specified will not solidify at −50° F. and a decrease in diacetone alcohol content would raise the solidifying point of the fluid.

The carbon chain of diacetone alcohol is very stable and is not broken except with strong reduction of oxidation. This is an important feature as effecting the stability of the brake fluid.

In place of castor oil, any oil can be used which has a low solidifying point, stability at a higher temperature and inertness toward rubber and the alcohol used. Also, I may add to my solution suitable non-corrosive agents, coloring agents, etc. as is well known in the art.

I claim:

1. A fluid for use in fluid pressure apparatus comprising a diacetone alcohol and an oil characterized by a low solidifying point, stability at a high temperature and inertness toward rubber.

2. A fluid for use in fluid pressure apparatus comprising castor oil and diacetone alcohol.

3. A fluid composition comprising diacetone alcohol, castor oil and potassium hydroxide.

4. A fluid comprising substantially 50% castor oil and 50% diacetone alcohol by volume.

5. The method of preparing a fluid for use in hydraulic apparatus, which comprises dissolving potassium hydroxide in diacetone alcohol and thoroughly mixing the solution with an equal volume of castor oil.

6. A fluid comprising one part by volume of castor oil to one part of diacetone alcohol to which has been added a small amount of potassium hydroxide.

7. The method of preparing a fluid for use in hydraulic apparatus which comprises slowly adding with stirring an alcoholic solution of potassium hydroxide to a mixture of castor oil and diacetone alcohol.

8. A fluid composition comprising castor oil, diacetone alcohol and potassium hydroxide.

9. A fluid composition comprising castor oil, diacetone alcohol, butyl alcohol and potassium hydroxide.

10. A hydraulic solution composed of castor oil, diacetone alcohol, and potassium hydroxide.

11. A hydraulic solution composed of castor oil and diacetone alcohol.

12. A hydraulic solution composed of castor oil, diacetone alcohol, and a neutralizing agent.

In witness whereof, I hereunto subscribe my name this 14th day of October, 1927.

ANDREW T. K. TSENG.